United States Patent [19]

Acker et al.

[11] Patent Number: 5,012,918
[45] Date of Patent: May 7, 1991

[54] INTERMITTENT WORK CONVEYING APPARATUS

[75] Inventors: John N. Acker; Bradley M. Andreae, both of Sturgeon Bay, Wis.

[73] Assignee: Therma-Tron-X, Inc., Sturgeon Bay, Wis.

[21] Appl. No.: 292,500

[22] Filed: Dec. 30, 1988

[51] Int. Cl.$^5$ .............................................. B65G 37/00
[52] U.S. Cl. .............................. 198/465.4; 198/468.6; 118/425; 204/298.01; 134/83; 104/127
[58] Field of Search ............... 198/465.3, 465.4, 468.6, 198/681, 795, 803.2; 118/425; 204/298 MC, 299 WH; 134/83; 104/127

[56] References Cited

U.S. PATENT DOCUMENTS

| | | | |
|---|---|---|---|
| 2,789,569 | 4/1957 | Davis | 134/83 |
| 2,866,565 | 12/1959 | Temple | 198/465.3 |
| 3,123,197 | 3/1964 | Pianowski | 198/468.6 |
| 4,749,465 | 6/1988 | Flint et al. | 204/298 MC |
| 4,812,211 | 3/1989 | Sakai | 118/425 |

FOREIGN PATENT DOCUMENTS 4642 6/1988 World Int. Prop. O. ....... 198/465.4

Primary Examiner—Joseph E. Valenza
Attorney, Agent, or Firm—Andrus, Sceales, Starke & Sawall

[57] ABSTRACT

A part conveyor includes a series of slide bars of equal lengths. Each bar is movable in a pair of parallel rails and in transfer rails at the ends of the parallel rails. The slide bars have upwardly opening U-shaped members projecting from the rails. A push rod simultaneously moves the slide bars through the rails to advance the bars. A cross rod rests in an aligned member for movement of the crossbar and part with the slide bars. A transfer rail unit is provided at the ends of each run for moving of the slide bars from the rails. In an over/under line, transfer rails receive and move the slide bars. A U-shaped carriage is mounted on vertically movable tracks for movement between and end of the rail run and a load source. The parallel rails drop below the top of the carriage sides and drops the cross rod onto the carriage. The carriage moves to a load source and the tracks are lowered to unload the cross rod and receive another cross rod. The tracks are raised and returned. When the rails move up, the slide bars pick up the new cross rod and places the load into the system.

25 Claims, 3 Drawing Sheets

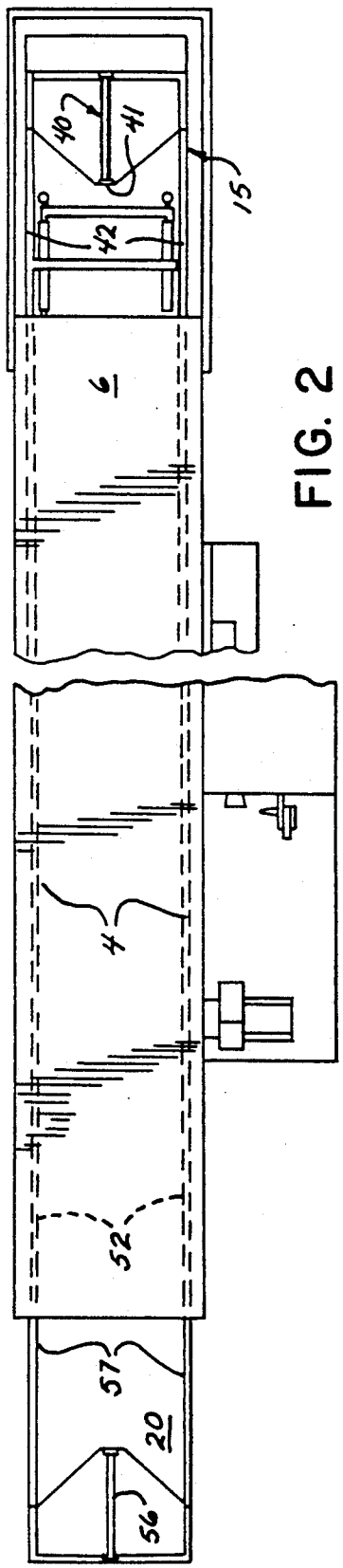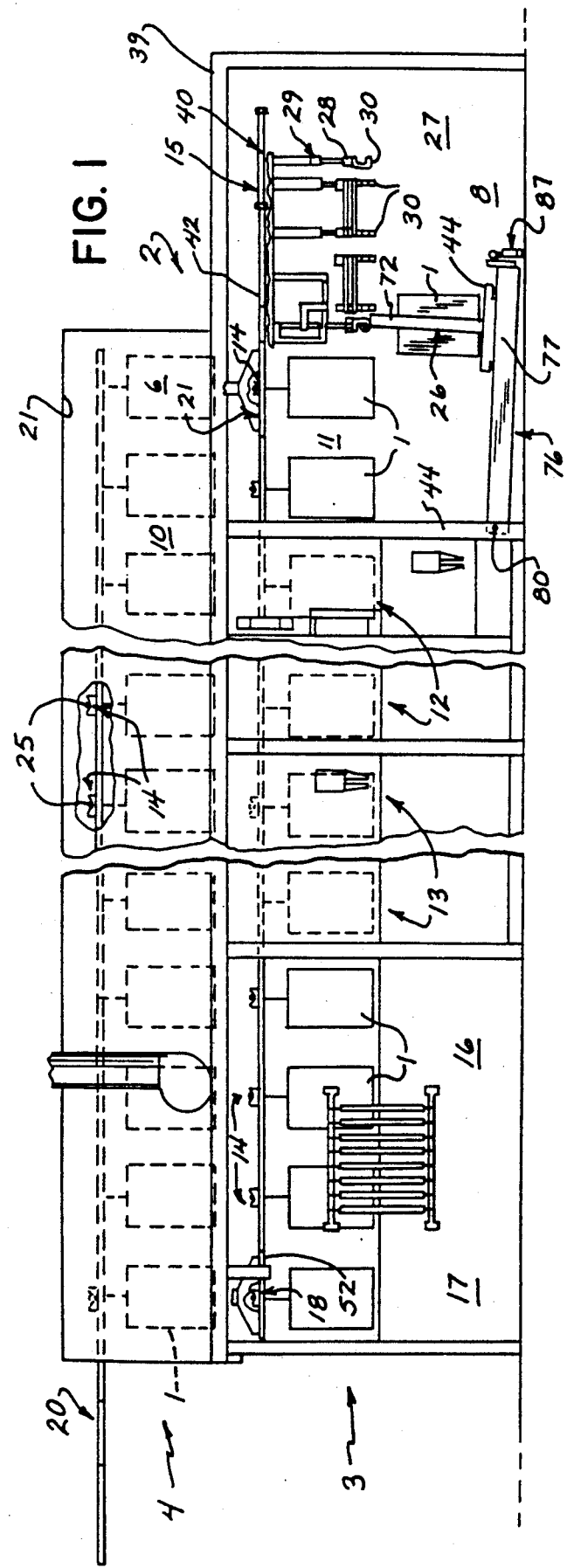

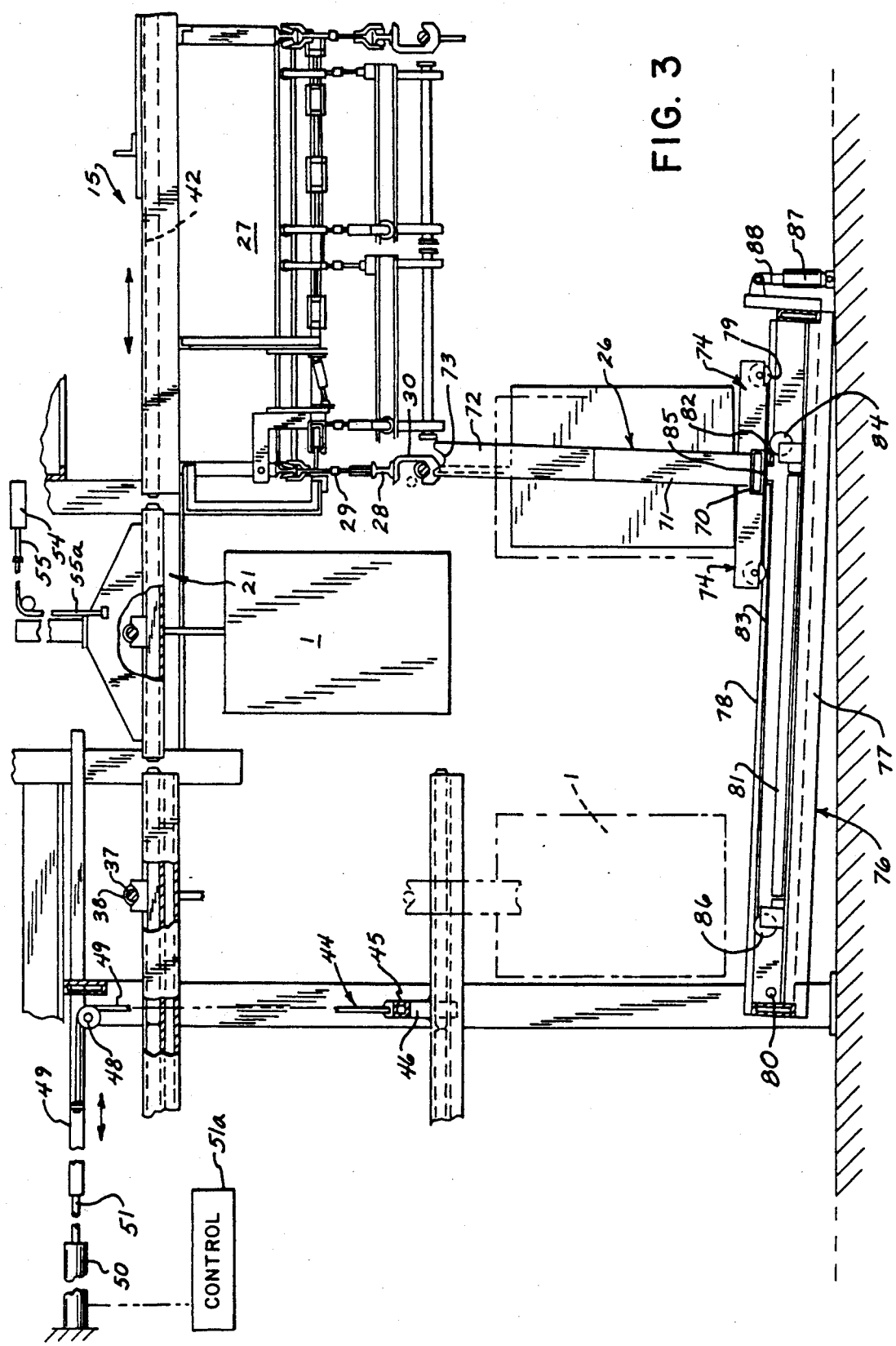

INTERMITTENT WORK CONVEYING APPARATUS

BACKGROUND OF THE PRESENT INVENTION

This invention relates to an intermittent work conveying apparatus for transport of a series of parts through equispaced work stations and particularly to such apparatus requiring multiple directional positioning of the work.

In various production processes, an article or work product, hereinafter generally referred to as the "part", is moved through a series of work stations for processing of the finished part. In many applications, the work on the part at each work station is automatically established and in some instances, a relatively short period of time may be allotted at each station. A typical example of an automated line is an electrocoating paint system wherein the part is sequentially treated to receive a paint application with the article sequentially processed to established a pre-determined coating thickness and finally processed to dry the applied coating. Each step in the process can be accomplished in relatively short period of time. Thus, the part may typically be processed at each station in a maximum of two to three minutes. The part is moved through the sequential positions or work stations in a stepped manner in one system and in a continuous uninterrupted manner or movement in another system. Continuous paint lines move the part through pretreating tanks, coating tanks and final treating tanks by an in-line conveying system. Generally, lengthy treatment and paint tanks are required to accommodate the sequential and continuous movement through the several stations. Generally, the prior art discloses a continuous conveyor of a chain type with the path of the conveying mechanism providing for the movement of the product in a rather smooth curved path into and from the various treating and painting tanks. Although satisfactory painting has been provided using such standard systems, the systems are large, requiring significant floor spaced and are relatively costly. Thus, the tank or container structure is very large to accommodate the continuous movement of the part through the tank structure while maintaining the product within the appropriate environment and atmosphere for product treatment. Such systems also are relatively costly because of the necessity of using large quantities of materials, such as paint, water and other chemicals associated with the large treatment baths or tanks.

Although an intermittent stepped system can be used to reduce the size of the structure, the movement of the product then requires the appropriate lifting and transfer of the product from one tank to the other. Such a system using conventional conveying mechanisms such as chain-type conveyors and the like also present a complex and costly mechanism.

Further, in view of the short cycle time required in any given station or tank, the loading and unloading of the part in an intermittent system presents further complications. Either a significant number of personnel is required for manual loading and unloading of product or various complex and costly loading and unloading mechanisms have heretofore been required.

Generally, present day technology has involved substantial investment in the machinery for electrocoating systems as well as significant maintenance cost and operating personnel cost, particularly related to the loading and unloading of parts and products.

Various articles and products can of course be coated with electrocoating processes. For example, cabinet panels and any other product which can be provided with an appropriate charge can be treated with an appropriate coating.

The short cycle time of any given station provides for relatively large production which minimizes the part cost and has justified the substantial investments required in the process apparatus.

There is however a very significant demand for improved apparatus permitting improved cycle times as well as more effective and less costly loading and unloading mechanisms and related transfer apparatus.

SUMMARY OF THE PRESENT INVENTION

The present invention is particularly directed to an intermittent or stepped transport apparatus having an improved conveying mechanism for the sequential stepped placement of a part into successive work stations, with the several parts at the several stations moving simultaneously into and from the stations and then simultaneously moving sequentially to the next adjacent station. In accordance with another significant feature of the present invention, an improved loading and unloading apparatus is provided to maintain maximum production. Thus, the loading and unloading apparatus is specially built to permit the loading and unloading within the maximum cycle time of any given station which for example, in an electrocoating system is typically two to three minutes.

More particularly, as applied to an electrocoating line, for which the present invention has been particularly constructed and adapted, a sequential series of tanks or stations are provided in immediately adjacent relationship. The part is passed intermittently from one station to the next with all parts held effectively stop at the station for the necessary processing period. An over/under sequential conveyor system is provided, with a drying mechanism mounted in overlying vertically spaced relation to the paint applying line. The over/under system is typical of a loop system, and other organization such as horizontal spacing or combined horizontal and vertically spacing of the conveyor or transport system may be used with the present invention. In accordance with the present invention, the part conveying structures includes a segmental conveying mechanism with equal segments for each part for conveying of the part from one station to the next station, with each conveying segment being movable in at least two different directions for changing the directional movement of the part. The segments are releasably engaged for linear movement by a drive unit such as push drive units.

More particularly, in a practical and unique embodiment of the present invention, the segments include a plurality of slide bar units slidably mounted in a pair of parallel tracks, rails or other guide elements The slide bar units include releasable couplings for receiving of a work carrier. In a practical embodiment, each slide bar unit carries an upwardly opening load support member. A part or part carrier member spans the spaced rails and is adapted to rest in the support members for movement of the part with the slide bar units. At the entrance and discharge end of the rails, transfer units are provided for moving of the slide bar units from the rails. With the slide rails aligned with the transfer units, the slide bar units are transferred from and to the slide rails, and can then be moved in the same or some other direction. In the over/under coating line, transfer rails with the slide bar units therein are moved vertically. Thus, at the discharge end of the paint applying line, the transfer rails move upwardly into alignment with the conveyor rails of the dryer unit. The slide bar unit is then moved into the dryer conveying rails and moves intermittently through the drying chamber. At the end of the drying apparatus, the part and slide bar units move to a drop rail unit which deposit the part into an automated load-/unload system.

In the preferred construction, the load/unload mechanism or unit includes a unique take-away conveyor or transport unit having suitable supports for the load carrier member which is releasably supported on the slide bar units. The slide bar units are placed in a transfer position at the load/unload system or unit for automatic transfer of the load.

A part change apparatus includes a pair of pivoting guide rails or tracks. A carriage unit is mounted on the tracks and include side members which extend upwardly, terminating in the upper end in transfer units. The carriage is coupled to a powered mechanism for movement between the entrance end of the coating conveyor and a part source unit. The pivoting movement permits the dropping of the transfer rails and the carriage. Thus, to unload or load a part, the transfer tracks are first positioned in a raised location and moved into alignment with the transfer position of the coating rails. The carriage unit is moved into underlying alignment with the slide units. The coating rails drop and the part carrier members drops onto the carriage, which then moves to the source. Thus, the transfer to and from the slide bar unit is created by relative vertical movement between the carriage and the rails. The tracks are pivoted down to unload the part carrier members onto a conveyance which removes the finished parts and aligns a new load carrier member and part with the carriage. The carriage tracks are raised to pick up the load carrier member with the new part and then moved to place the part onto the slide units.

Although described using slide units and slide rails, the load segments can of course be wheeled or otherwise supported devices mounted on or in a suitable track unit. In a practical application applied to the coating line, the slide units were formed of a box-like channel of the appropriate desired length. Brass shoes were secured to the bottom side of the tube to slidably support the slide for movement through the support rails or conveyor rails.

In the preferred construction, the individual segments are slidably mounted along a common rail structure. The common rail structure is mounted at a plurality of lift stations or vertically moving stations by a supporting chain and sprocket. The chain in turn is coupled to a positioning slide extended throughout the length of the unit. The sliding of the rail causes the chain to move over the sprocket for raising and lowering of the slide for corresponding positioning of the work carried thereby.

The present invention thus provides for the individual load segments slidably mounted within a suitable slide structure for sequential and intermittent movement between the several work stations with appropriate lateral transferring conveyors for movement of the work piece from one part of the line to another and for movement of the work piece into and from the work station.

BRIEF DESCRIPTION OF THE DRAWINGS

The drawings furnished herewith generally illustrate the best mode presently contemplated for carrying out the invention and are described hereinafter.

In the drawings:

FIG. 1 is a side elevational view of a slide rail conveyor system constructed in accordance with the teaching of the present invention;

FIG. 2 is a plan view of FIG. 1;

FIG. 3 is an enlarged sectional view taken generally on line 3—3 of FIG. 2 and illustrating a construction of the slide rail conveyor system shown in FIGS. 1 and 2;

DESCRIPTION OF THE ILLUSTRATED EMBODIMENT

Figure 4:
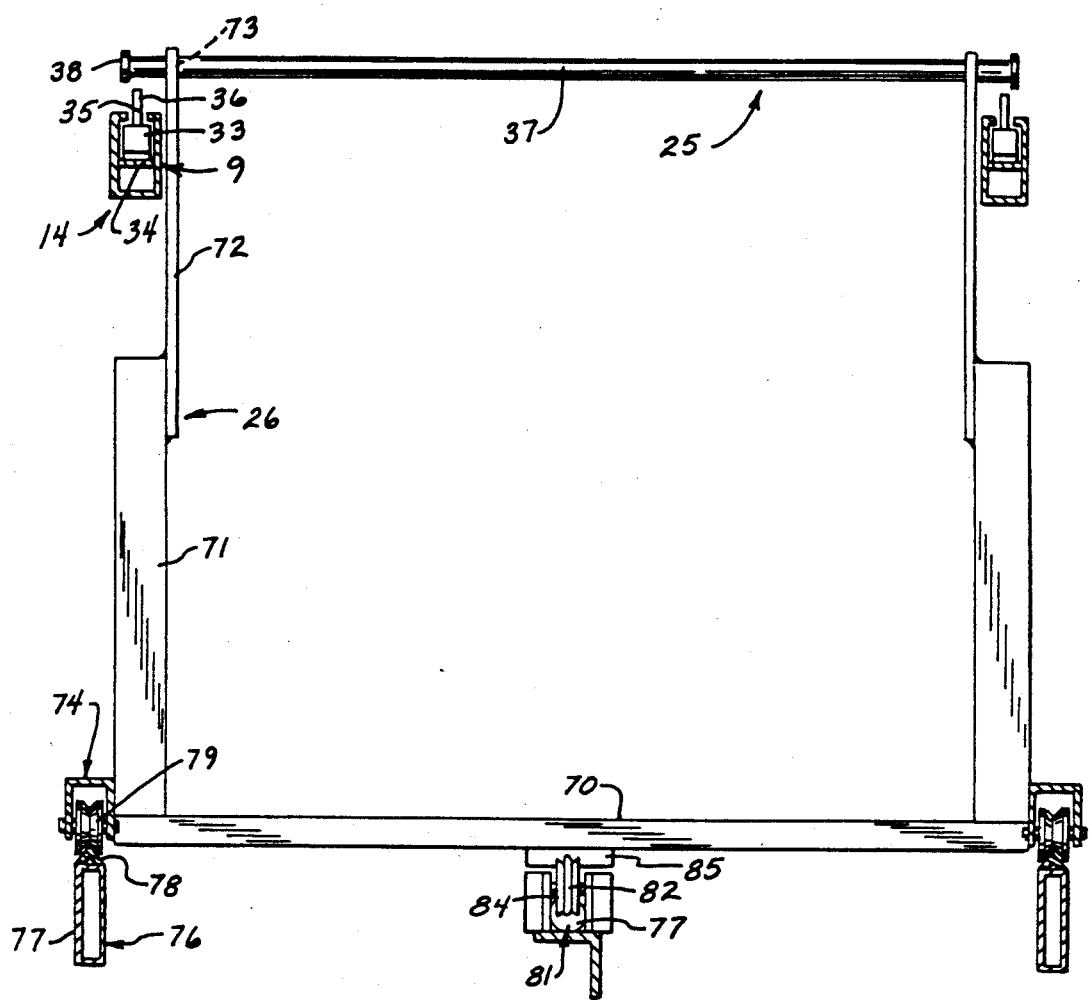
FIG. 4 is a vertical transverse section taken generally on line 4—4 of FIG. 3.

Referring to the drawings and particularly to FIGS. 1 and 2, a plurality of components or parts 1 are shown passing through a coating apparatus 2 illustrating an embodiment of the present invention. Each of the parts 1, although shown as an identical member, may of course have any different configuration. The only limitation on parts 1 is that they must fit within a series of processing or work stations which are presently described and further must each be adapted to receive a similar treatment and coating. The present invention has been particularly applied to an electrocoating system in which a coating is applied and dried in a continuous processing line. The illustrated coating apparatus is an under-and-over system including a bottom or lower coating section or line 3 and a top or upper drying section or line 4. A lift section 5 is located at the common downstream end of the coating section 3 and the upstream end of the drying section 4 The lift section 5 provides for automated transfer of the parts 1 from the coating section 3 to the dryer section 4. The drying section terminates in a drop station or section 6 at which the part 1 is lowered downwardly from the drying section into a transfer section 7. The finished part 1 is lowered into the transfer station or section 7 which includes an automated transfer apparatus 8. The parts 1 are thus moved into and from the circulating path of the lines 3 and 4 at section 7 by apparatus 8. The present invention is particularly directed to the construction of the support and transfer of the parts 1 using a slide rail concept and system for supporting and moving of the individual parts through the various portions of the system and to the automated apparatus 8 for transfer of parts 1.

Generally, in accordance with the illustrated embodiment of the present invention, the coating section 3 includes an elongated continuous slide rail assembly 9. The slide rail assembly 9 is vertically movable between a raised load transport position or level 10 at which the various parts are moved into and through the coating section 3. The parts 1 are shown in full line illustration in the raised level. The rail assembly 9 is adapted to reciprocate vertically and drop the parts to a treating or coating position or level 11, as shown in phantom. In the lowered positioned, the parts 1 are dropped into various treating stations and apparatus. For example, a typical coating line 3 may include eight stages or pretreat wash stations 12, consisting of 8 different work stations, only 2 of which are shown in FIG. 1 and 2, and 4 coat and rinse stations 13 of which only a coat station and a final rinse station are shown. The coating section 3 includes the multiple station transfer lift section 5, shown including only a first fitter station and a lift station for purposes of simplicity in the illustrated embodiment of the invention. Each of the illustrated several stations in the generally rectangular work or processing area is adapted to accommodate the part 1 and supporting mechanisms. The transverse center lines of the work stations 12 are spaced by a constant distance. The parts 1 are similarly spaced by the distance between the successive stations within the system and so held as they move through the rail assembly 9.

Each part 1 is particularly supported by a separate slide unit 14 slidably disposed in the rail assembly 9. Each slide unit 14 is of a similar construction and corresponds in longitudinal length within the rail assembly 9 to the corresponding length of the work stations 12. By pushing on the upstream end of the slide units 14 within the rail assembly 9, all units 14 and parts 1 are moved the appropriate distance. A slide push unit 15 is mounted to the upstream end of the rail assembly 9 and operatively engages the first slide rail unit 14 at the upstream end of the assembly at the transfer section 7. The push unit 15 moves into the rail assembly 9 for a distance equal to the length of a slide unit and thus simultaneously steps all slide units 14 and supported parts one work station step for moving of the parts into alignment with the next work station. The forward or downstream most part 1 aligned with the last work station is moved from the coating section 3 into and through the lift section 5 for automatic transfer to the drying section 4 in appropriate sequence.

The illustrated lift section 5 includes filter station 16 and a downstream lift unit 17. Thus, in the sequence, the parts are moved sequentially through the station 16 and then into the lift unit 17.

The lift unit 17 includes a separate lift rail assembly 18 adapted to be aligned with the rail assembly 9. The separate rail assembly 18 is supported for vertical movement and is of a length corresponding to the length of a slide unit 14. Thus, as a slide unit 14 is moved into the rail assembly 18, the part 1 is mounted for vertical movement from the coating section 3 into alignment with the drying section 4.

The drying section 4 includes a fixed horizontal rail assembly 19 for receiving of the slide unit 14 from assembly 18.

A dryer push unit 20 is mounted to the top or upper level of the drying section 4 and to the upstream end of the rail assembly 18 and dryer rail assembly 19. The push unit 20 transfers the slide unit 14 from rail assembly 18 into aligned rail assembly 19 and thus moves the parts in corresponding timed relation through the drying section 4 in corresponding timed relation to the parts moving through the coating section 3 and for a corresponding horizontal length or distance. The downstream end of the rail assembly 19 terminates at the drop station or location 6. A vertically movable drop rail assembly 21 is located at the drop station and is vertically movable between alignment with the dryer rail assembly 19 and the coater rail assembly 9. It again has a length corresponding to the length of a slide rail unit 14. This provides for lowering of a part 1 discharged from the drying section 4 into the plane of the coating section 3 and into the transfer section 7 of the system.

The transfer section 7 includes a finished part station 22 aligned with the drop section 6 and a load change station 23 immediately adjacent the upstream end of the coating section 3. The transfer stations 22 and 23 are aligned, with the drop rail assembly 21 of the dryer section 4 located in the same plane as rail assembly 9 when in the raised transport position level 10. The load-/unload transfer apparatus 8 automatically provides for appropriate transfer of the parts 1 from and to a slide unit 14 at station 23 to complete a work cycle, which is repeated for continuous production.

The main or coating rail assembly 9 extends upstream from the first work station 12 into the station 23 of the transfer section 7. In the retracted position, assembly 9 terminates in precise and close alignment with the drop rail assembly 21. The push unit 15 for the coating section 3 moves through the aligned drop rail assembly 21 and pushes the slide rail unit into the aligned rail assembly 9 thereby simultaneously moving the slide units 14 in the rail assembly 9 into the coating section 3. The finished part and associated slide unit 4 is then located in the transfer station 23 for removal and replacement by apparatus 18.

In the illustrated embodiment of the invention, the rail assemblies each include laterally spaced supporting rail structures as more fully developed hereinafter. Separate slide units 14 are mounted in each of the rail assemblies. The part 1 is carried by a laterally extended load carrier member 25, shown as a rod member, the opposite ends of which are releasably secured to slide units 14.

A load/unload carriage 26 of apparatus 18, in the form of a truck-type unit, is movably mounted at the transfer section 7. Carriage 26 is aligned with a slide unit 14 at the transfer change station 23 and relative vertical movement of the rail assembly 9 transfers the load member 25 to or from the slide unit 14. The carriage 26 is horizontally movable for moving of the load carrier member 25 and associated part to or from the load/unload station. Movement of the carriage 26 vertically orients the load member and part with respect to an automated load/unload source apparatus 27 for automatic removal of the finished part 1 and replacement thereof with a new or unfinished part 1.

The source apparatus illustrated is a carrousel-type overhead conveyor including a plurality of recirculating load supporting brackets 28. The source apparatus 27 includes a plurality of load carrier support brackets 28 pivotally secured to an endless chain unit 29 for movement in a horizontal plane. A separate bracket 28 is provided for each carrier member 25 and includes a pair of spaced hook members 30. The carrier member 25 is placed with hook member 30 by movement of carriage 26 to remove the finished part 1 and removed from the hook members 30 of the next bracket 28 by opposite movement of carriage 26 to establish the desired automated interchange. Each bracket 28 is slightly longer than the load carrier member 25 and includes the pair of spaced depending hook members 30 adapted to support and carry the load carrier member and associated part 1 from and into alignment with the carriage 26. A spaced main part source location is provided in spaced location to the carriage location where the finished part is removed and a new part 1 and is introduced into the source apparatus. Ample time is provided for convenience loading and unloading of the parts 1 during the period between the transfer of parts throughout the load/unload system. Thus, the source apparatus can be loaded and reloaded during the period that the work or parts are removed from the section 7 and during the part processing time in each cycle.

Thus, briefly summarizing the system before describing the various elements in detail, parts 1 are automatically transferred from and to the load/unload carriage. In the load movement, the part is carried on the upper end of the carriage which is then moved forwardly and over the rail assembly 9. The load carrier member is located in alignment with the location of the slide unit 14 in the change location 23 when the rail assembly 9 moves upwardly, the load member 25 with part 1 in place is picked up by the aligned slide unit 14 for transport through the system. With the insertion of a new part 1, the push units 15 and 20 are simultaneously actuated to simultaneously move the newly loaded part into the first station of the coating section or line and simultaneously moving all prior loaded parts the corresponding precise distance to align it with an appropriate new section or stage of the coating section into an appropriate position in the lift or drop sections and through the dryer section. The parts are held in each stage and position for the fixed working time, which in a practical electrocoating line may be on the order of 2 to 3 minutes.

During the fixed time period for processing of part 1 in the several stations, the finished part 1 is removed from the processing line and transferred to the carriage, transferred to the source apparatus where a new part is loaded onto the carriage and transferred back into alignment with the lowered rail assembly 9 in alignment with the last slide unit 14. The load member with the new part is thus aligned with the available slide unit located in the upstream most end of the rail assembly 9. The new load carrier member 25 is held in position and picked up as the rail assembly 9 rises. During the same processing time, the last or finished part has been moved into the drop section of the drying section, and lowered into the unloading position aligned with the coater push unit 15. The apparatus is again in position to initiate a new operating cycle upon termination of the treatment of the parts at the several stations or stages.

The present invention is directed to the provision of the slide rail conveyor particularly including the individual slide units or other individual segments for each part 1 with the control timed movement related to the processing time at the plurality of work stations. In addition, in the illustrated embodiment of the invention, the automated load/unload apparatus provides a further and unique apparatus for the automated load and unloading of parts 1 with respect to the slide rail conveyor. The illustrated embodiments of the loading and unloading unit are presently described in detail. The load and unload conveyor apparatus for transfer of parts 1 to and from the loading/unload apparatus may be of any desired or suitable construction. The apparatus is shown and briefly described. A full de is presented in the co-pending application SN298473 of the present inventor entitled "Part Indexing And Positioning Apparatus" and filed on even date herewith.

Figure 5:
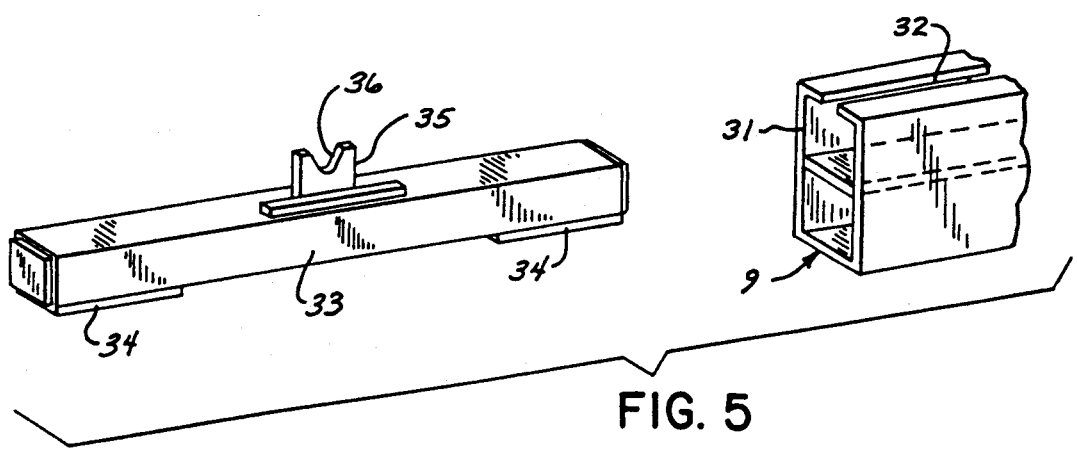
FIG. 5 is an exploded pictorial fragmentary view of the elements shown in FIGS. 3 and 4.

More particularly and as more clearly shown in FIGS. 3 through 5, the illustrated slide rail assembly 9 includes first and second laterally spaced similar rails 31 extending throughout the length of the coating section 3, the transfer section 5 and 6 and into the change station 23 of the transfer section 7. Each of the rails 31 is similarly constructed as a box-like channel having a longitudinal upper slot 32. The rails 31 are mounted in a common horizontal plane for simultaneous and corresponding movement, as more fully described as hereinafter. Each of the horizontally mounted rails 31 is adapted to support the corresponding slide rail units 14 for transport of parts 1 through the apparatus and particularly the coating section 3.

Each slide unit 14 includes a pair of similarly spaced slides 33 in the form of a box-like member of a length correspondingly precisely to the length of each stage or work station of the coating section 3 and transfer section 7. Front and back shoes 34 are secured to the underside of the box member or slides 33. The cross section through the box member and interconnected slide shoe closely complements the internal cross section of the box section of the corresponding rails 31. A load member 35 is secured to the top center of each slide 33 and is located centrally of the longitudinal length of each slide 33. Each load member 35 is similarly constructed as a plate member welded or otherwise secured to the slide 33 and projecting upwardly through the slot 32. The upper edge of the member is provided with a V-shaped opening 36 for receiving and supporting the aligned end of the load carrier member 25.

The carrier member 25 include a round rod 37 spanning the assembly and resting in the V-shaped opening 36. Flat end walls 38 are welded or otherwise secured to the ends of the rod and project outwardly slightly thereof to establish lateral location and support of the rod to the load members 35. The walls 38 are located accurately on the slide members 33 and hold the part 1 for accurate movement into and from the work apparatus at the various stages or stations.

The coater push unit 15 is secured to the frame structure 39 of the apparatus and includes a hydraulic cylinder 40 mounted to the frame structure. A piston rod 41 projects outwardly of the cylinder unit for reciprocation in a horizontal plane. A pair of laterally spaced push rods 42 are secured to the piston rod with a suitable guide and supporting structure 43 for locating of the push rods in alignment with the spaced rails 31 in the raised position. The cylinder 40 is connected to a suitable pneumatic or hydraulic supply for reciprocal movement of the piston and attached rods 42. In the retracted position, the ends of the push rods 42 are located upstream of the drop location and thus upstream of the lowered position of the drop rail assemblies 18. Extension of the piston rod 41 and the push rods 42 force the rods 42 to move through the rail assemblies, moving the slide units 14 from the drop rail assembly 18 into the aligned rails 31, with a corresponding stepped movement of the slide units 14 and the associated parts 1 in the rail assembly 9.

The slide rails 31 of assembly 9 are mounted for simultaneous vertical movement between the raised or top transfer level 10 and the bottom or lowered work level 11.

The rails 31 are similarly supported by a plurality of vertical support posts 44 of the frame structure 39 and are longitudinally spaced throughout the length of the apparatus. Each support post 44 is a post like assembly including a fixed support rigidly affixed to the frame structure 39 and defining a slide rail or support. A slide 46 is secured to each of the rails 31 of assembly 9 and project into the support unit 44 to establish a guided vertical movement of the corresponding rails 31. The slides 44 are connected by a cross beam 45. Positioning chain units 47 are provided at each of the supports 44 to one side of the assemblies 9. The one end of the chain is secured to the one slide 46 at each side of the assembly. The chains 47 extends upwardly and then horizontally over fixed sprockets 48. The outer end of each chain 47 is fixed to drive rails 49 for moving of the chains horizontally to thereby lower and raise the rails 31. A powered cylinder unit 50 is mounted to a frame structure and includes a piston rod extended forwardly. The piston rod is attached to a member connecting the drive rails and is operative to reciprocate and move the associate chain units for positioning of the rail units, providing guided movement of the rails assembly 9. The continuous rails 31 provide the synchronized and necessary movement of the work parts 1 between the raised transfer position or level 1 and the lowered work position or levels 11. A switch control unit 51a is shown mounted adjacent the rail 49 to selectively reverse the rail movement at the lowered level 10. The unit 51a jogs the part 1 within the operative station for improving of the coating process.

The lift section 7 which includes the rail assembly 18 is actuated in timed sequence with the coating section 3. The rail assembly 18 includes a pair of fixed rails 52 interconnected for simultaneous vertical positioning of the rails 52. As shown most clearly in FIG. 2, for the assembly 21 a hydraulic cylinder unit 54 is mounted to the frame structure and includes a piston rod unit 55 coupled to the rails 52 with chains 55a for vertical positioning of the rails 52 of assembly 18 between the alignment with the rail assembly 9 and the rail assembly 19 of the dryer section 4. It thus provides for selectively transfer of the parts 1 from the coating section 3 into the drying section 4. The drying section push unit 20 is constructed generally in accordance with the construction of the coating section push unit 15 and includes a hydraulic cylinder unit 56 with a pair of pusher rods 57 interconnected to each other and the piston rod of the pusher unit 20. The push unit 20 is actuated in timed relation and in synchronism with the push unit 15 of the coating section to provide for synchronized movement of the parts 1 through the coating section 3 and through the drying section 4.

The rail assembly 19 for the drying section 4 is similarly constructed to that of the coating section but with rails 60 fixedly mounted in a common horizontal plane. The slide units 14 and parts 1 are moved through a single plane in the drying section for appropriate sequential processing and drying of the coating and sequential discharge into the drop section 6. Thus, at the end of the drying section, the slide rail units 14 move into the drop rail assembly 21 including a pair of rails for vertical positioning, with a construction corresponding to assembly 18.

The part 1 is thereby moved downwardly into alignment with rails 31 and transferred forwardly into the transfer location immediately adjacent to the first stage of the coating section 3 for movement and interchange for a new part 1 through the use of the load/unload apparatus and particularly carriage 26.

More particularly, referring to FIGS. 3 and 4, the carriage 26 is generally a U-shaped member having a rigid support beam or base 70 extended laterally of the apparatus. Vertically upstanding side walls or brackets 71 project upwardly from the base 70. The upper ends of the brackets 71 are rigid plate-like members having upper load arms 72 adjacent to a side of the rails 31, respectively. The upper ends of the arms 72 are similarly formed with a V-shaped opening 73 which open upwardly. The arms 72 are spaced in accordance with the length of the rod 37 to receive the carrier rod 37, with the end walls 38 of the rod located immediately outwardly of the each of the corresponding plates 72 and the slide units 14. Thus, the arms 72 accurately support the load carrier rod 37 centrally of the rails 31 with the part 1 depending downwardly therefrom between the rails 31. The U-shaped carriage 26 defines a rigid supporting structure for movably supporting of the part 1 and suspended from the support rod.

The U-shaped carriage 26 is supported by a pair of laterally spaced trucks 74 and 75 which in turn are mounted on the pair of laterally spaced rail or track units 76 and which extend outwardly or upstream beneath the transfer load/unload stations 22 and 23.

Each track unit 76 is similarly constructed of a heavy supporting box beam 77 extending throughout the length of the carriage movement.

The upper edge of the track unit 76 includes an inverted V-track 78. The trucks 74 include truck wheels 79 and are secured to the ends of the cross beam of the carriage. The wheels 79 have a V-shaped edge or face groove and rest on the V-tracks for movement along the beam.

The track beams 77 are pivotally supported at the downstream end adjacent to the transfer location 23 on a laterally extended pivot shaft 80. The beams 17 extend rearwardly or outwardly from the pivot shaft 80 to the conveyor source apparatus 27.

The carriage 26 is connected to a hydraulic cylinder unit 81 mounted between the beams 77. The cylinder unit 81 includes an internal piston unit secured at the opposite ends of the unit 81 to a cable 82 and 83. The one cable 82 extends over a guide roll 84 and is secured to the carriage 26 as at coupling 85. The second cable 83 is similarly mounted to the opposite end of the cylinder unit 81 over a guide roll 86 and secured to the carriage 26 at coupling 85. Reciprocation of the cylinder unit 81 to reciprocate the carriage 26 between the two operative locations.

A second cylinder unit 87 includes a piston rod 88 coupled by a bracket 89 to the outer cross brace 90 of the tracks to raise and lower the tracks and thereby to raise and lower the carriage. Retraction of the piston rod 88 results in the dropping of the tracks to lower the carriage and thus the load arms 72 at the source apparatus 27.

The piston rod 88 is extended to raise the carriage 26 at the transfer station 23 such that the upper ends of the carriage load arms 72 and particularly the V-shaped openings are just above the horizontal plane of the slide units 14 with assembly 9 in the top or raised transfer position. Thus, with a finished part 1 placed in the transfer station 23 and supported by slide units 14, the movement of the carriage 26 with rails 31 at the transfer location results in alignment with a finished part 1 and supporting slide units. When the rail assembly 9 moves downwardly to relocate and lower parts 1, the finished part 1 is transferred to the carriage 26. The cylinder unit 81 is actuated to carry the carriage 26 and part 1 from the transfer station 23 to the source apparatus 27. The exchange thus occurs at the source apparatus 27 with the finished part removed, and a new part and its load member inserted on the carriage 26. The rod 37 of carrier member 25 is aligned with the openings 91 of the hook member or brackets 28 with the carriage 26 at station 23 and with finished part 1 on the carriage as shown in phantom in FIG. 3. Cylinder unit 81 is actuated and moves the carriage to source apparatus 27 and located the rod 37 within the opening 91 at which time cylinder unit 87 is actuated to lower the track beams 77. The arms 72 of carriage 26 move below the hook members 30 and deposit the carrier member 25 with part 1 to the hook members 30. The brackets 28 are indexed one unit or step to remove the finished part 1 and align a bracket 28 with a new part 1 with the dropped carriage, as shown in FIG. 3. The track beams 77 are then raised to pick up the new carrier member 25 and the new part 1. The raised carriage 26 is returned to the forward position and station 23 with the carrier member 25 passing over the rails 31 and into alignment with the slide rail unit 14 in the lowered rails 31. The load carrier member 25 is picked up by the slide units 14 when the rails 31 are raised to the transport level 10 for subsequent cycling through the apparatus.

The present invention particularly in the illustrated embodiment establishes a continuous stepped movement of work products through a series of work stations in a closed loop with a relatively low cost, long life and reliable transport and conveyor system. The components are readily formed using present day technology and are rugged, reliable and long life elements which are particularly adapted to commercial production environments. The apparatus requires minimum maintenance and is readily controlled through simple logic control systems including simple relay logic. Obviously, microprocessor based controls can also be readily provided where desired.

Although the slide units are shown formed as elongated bar-like members with special slide shoes, any other suitable elongated slide-like member can be provided. In addition, the unit can readily employ wheeled slide units such as trolley type units. Thus, the illustrated elongated bar members could be provided with fore and aft wheel structures to establish a rolling support for the slides. Thus, as used herein, the definition involving "slide" is used generically to cover any form of an elongated fixed rigid device or member which will provide a fixed stepped movement in response to the forced movement at one end of the series of separate devices for carrying of the individual load units.

Although illustrated with a single support unit per slide bar, each slide bar can be provided with a plurality of the upwardly opening units or other suitable releasable support longitudinally spaced along the bar. A load cross bar would then be deposited within each unit for simultaneous corresponding transfer of a plurality of loads through a line. In such a system, the load interchange apparatus can be similarly constructed to provide for the simultaneous movement of all of the loads from the slide bar units in the same or some related manner.

Similarly, the carriage structure shown can of course be modified with any other type of a transport system adapted to provide for the releasable movement of the work from the slide rail conveying unit. For example, the cross member under certain instance might be secured to the slide unit for continuous movement through the system with the parts interconnected and disconnected from the member by the carriage structure. Further, other forms of overhead or floor mounted carriage structure may be used for the interchange, although the illustrated embodiment provides a very practical and long life structure.

Although the load change apparatus with the carriage structure provides a satisfactory apparatus for removing and replacing of the loads to the slide bar units, other similar transfer or transport devices may be used For example, laterally spaced endless chains can be mounted one each adjacent the rail. Each endless chain would rotate in a vertical plane with a top horizontal run and a lower or bottom run. The upper run is located in a horizontal position to pick up the cross member from the slide rail units as the load drops downwardly. The chain would then be indexed to the source apparatus. The chain would be rotated in a stepped manner at the source apparatus. As the chain rotates downwardly to the return run, the support unit would move from an upwardly opening twelve o'clock position downwardly to a depending six o'clock position. In so moving, the load crossbar would automately drop from the load support member to the hook members on the source apparatus or other suitable source apparatus provided. Such an endless chain application would be particularly adapted to the multiple load system. The chain after moving to the source apparatus would be moved in a stepped manner to allow one load crossbar to drop into the apparatus, remove it and simultaneously move another member pickup unit into position to receive the next load crossbar, at which time the chain would be stepped to drop the next crossbar. After transfer of all loads, a reverse chain cycle would be used with the chain movement reversed and moved in an indexed manner in synchronism with the source apparatus. The source apparatus in a stepped manner would locate a load crossbar and load with the chain unit. The reverse movement of the chain unit would cause the support units to move from the depending six o'clock position upwardly to the twelve o'clock position and in so moving would pick up the load crossbar for purposes of transport of the load to the transfer stations.

Further, the slide conveyor unit and coating apparatus in the illustrated embodiment of the invention involves the series of coat, wash and rinse tanks for sequential treatment of the work. In such systems, it is often desired to change the particular paint, the wash solution or the like depending upon the particular product specification. For example, in certain processes the work may be washed with a phosphate solution. Iron phosphate and zinc phosphates are two known solutions used in industry. Iron phosphate is preferred because disposal of the zinc phosphate presents particular problems based on its severe pollution characteristic. Although not specifically illustrated, the coating line can be and has been constructed with side-by-side tank units movable laterally of the line for selective alignment with the slide rail conveyors. One or more tanks can be interconnected for simultaneous positioning or each individual work station can be provided with an individual tank for simultaneous for individual lateral movement. In addition, a tank interchange system may be provided for moving of new tanks with special or different liquids into the lateral tank transfer apparatus. For example, if a new color is to be added, a tank of the colored paint can be placed onto the lateral conveying mechanism such that at the next transfer it replaces one of the other existing colors in the system. Thus, it is not necessary to retain only the particular individual tank units in use at any given time. Others can be added directly or as replacements by suitable shifting of the tanks into and from the system.

Various modes of carrying out the invention are contemplated as being within the scope of the following claims and particularly pointing out and distinctly claiming the subject matter which is regarded as the invention.

I claim:

1. A work processing apparatus comprising a first section and a second section mounted in spaced alignment and connected at a first end by a transfer section and at a second end by a load and unload section, said first section including a plurality of equispaced stations with the part moving the same distance between each station to the next adjacent station, a transport location in spaced alignment with said stations through which parts are moved into alignment with the stations, a slide rail conveyor unit including laterally spaced slide rails extended longitudinally across all of said stations and similar laterally spaced slide rails extended throughout said second section, a plurality of slide units filling each of said rails and each slide unit having a length corresponding to the length of movement between each of said stations, a transfer device to transfer a slide unit from the downstream end of the first section to the upstream end of the second section, a reciprocating drive system coupled to transport the slide rail unit at the input end of the first section and at the input end of the second section for the length of a slide unit for circulating of said slide units through said first section and said second section in a continuous stepped sequence, movable transfer device at the downstream end of said first section and moving between a first position aligned with said rails of said first section and a second position aligned with said rails of said second section, said rails of said second section including an inlet end located immediately downstream of said vertically movable transfer device whereby said slide unit in said transfer device moves into said rails of said second section in response to longitudinal movement of the slide unit from said transfer rail, and means located at said input end of said rails of said first section for selectively connecting and disconnecting of parts from said slide units at said inlet end of said first section.

2. The apparatus of claim 1 wherein said first and second sections are supported in vertically spaced aligned relation with said slide rails of said section in vertical alignment, said transfer device including a pair of rails of a length equal to at least one of said slide units and moved vertically between the rails of said first and second sections.

3. The apparatus of claim 1 wherein said transfer device includes a pair of transfer rails of a length corresponding to said slide units and a powered device connected to said transfer rails and moving the rails between the rails of said first and second sections.

4. The apparatus of claim 3 wherein said rails in said second section extending to the inlet end of said rails of the first section, a transfer device including a pair of transfer rails of a length corresponding to at least one of said slide units, and a powered device connected to said transfer rails and moving the rails between the rails of said first and second sections.

5. The apparatus of claim 1 wherein said transfer device includes transfer rails located immediately adjacent to the downstream end of said first section rails and discharge rails immediately adjacent the upstream end of said second section rails, said transfer rails having a length corresponding to a length of a slide unit and providing for moving of a slide unit from the first section into alignment with the second section for transfer of the slide unit from the first to the second sections, said reciprocating drive system including a separate push rod unit for each of said sections and engaging of the slide unit in the transfer rail aligned with the input end of the second section for moving of said engaged slide units into said rails of said second section and thereby simultaneously moving of the slide unit from the opposite end of the rails of the second section into the discharge rails at the discharge end of said second section, and control means for actuating of said push rod units in timed sequence to establish and maintain continuous stepped movement of said slide units and interconnected parts through said apparatus.

6. In the apparatus of claim 1, including vertical support means longitudinally distributed in spaced relation throughout the length of said rails of said first section, a vertical powered unit mounted to said support means for vertical guided movement, connector means connecting said vertical powered unit to said rails for vertical positioning of said rails and thereby lowering and raising of said rails between a raised transport position and a lowered work position, and a transfer apparatus located adjacent the input end of said first section and operable to insert a part onto a slide unit in response to said movement of said rails.

7. The apparatus of claim 6 wherein said connector means comprises a first connector connected to said rails, a chain secured to said first connector a sprocket fixedly mounted above the raised level said rail, said chain extending vertically upwardly said first connector over said sprocket, a common connected to the extended end of said chains simultaneously positioning of said chains to raise and lower said rails while maintaining planar relationship of said rails and slide units.

8. The apparatus of claim 7 wherein said apparatus including a movable transport device a pair of spaced support members located in spaced adjacent relation to said vertically rails in alignment with the slide units in the and projecting upwardly of the lowered position rails whereby lowering of the rails transfers a from the slide units and raising of said rails a part to said slide units.

9. A conveyor apparatus for moving parts from one station to an adjacent work station in a series of equispaced stations, said work stations located in abutting engagement and whereby said stations are spaced by a single common distance between adjacent stations, comprising at least one row of slide elements mounted in end-to-end engagement and having a releasable member for support of at least one part, guide means for supporting of said elements for simultaneous movement for an input station, means releasably coupled to an end element and operable to move said end element toward all of the other elements and thereby advancing all of said elements a corresponding fixed distance corresponding to the spacing between said stations through said guide means, said guide means including first and second parallel rows of guide means including said elements, a connecting cross member secured to laterally aligned slide elements in said guides and defining a member for receiving of parts to be worked on at said stations, means for removing of the cross member and for placing a cross member on said elements at said input stations, said means including an automated transfer apparatus operated in timed relation to the movement of said elements and including a transfer apparatus sequentially aligned with said elements at said input stations and moveable to a change station, and a conveyor mechanism operable to remove a cross member and to insert a cross member at said change station for return of said transfer apparatus with the inserted cross member to said transfer station and transfer of said cross member on the same slide elements.

10. The apparatus of claim 9 wherein said guide means define a continuous loop track between an entrance end at said input station including the first slide element and a discharge end for receiving of the last slide element in the loop track, means between said entrance end and said discharge end for automatically and in timed relation removing of the finished part and replacing thereof with a new part to maintain a continuous close circuit system of said slide elements with loads transferred to and from said system for sequential movement through the work stations.

11. In the apparatus of claim 10 wherein each of said slide elements is an elongated rigid slide bar having a constant cross section and all bars having essentially the same length, each of said guides is a rail receiving said rigid bar and complementing the cross section of said bar to provide a guided movement, said rail having a top slot, said slide bar having a top vertical carrier projecting through said slot and opening outwardly of said slot, a cross bar member resting in said carrier of the aligned bars in said parallel rows whereby parts are added and removed by vertical movement of said cross bar member.

12. The apparatus of claim 9 wherein said guide means includes an entrance end and a discharge end located in close spaced relation for introducing and removing of said slide elements from a common location, said guides including a pair of parallel runs joined by a transfer section and defining an essentially closed loop between said entrance end and said discharge end, said transfer section including at least one linear turning guide element having a cross section corresponding to said elongated guides and operable to move between said parallel guide elements for conveying said slide elements from said first run to said second run, said turning guide e element operating in synchronism with said movement of said slide elements to continuously maintain movement of said slide elements in a closed path through said guide means.

13. In the apparatus of claim 12 wherein a load/unload guide element is mounted for movement between said discharge end and said entrance end with said guide element in alignment with the guide element of the first parallel run and in alignment with the guide element of the second parallel run for transferring of the slide element with a finished part from the discharge end into the upstream end of the guide element at said entrance end, and means to automatically remove and replace said slide elements from said guide element at said entrance end for selective removal of a finished part and application of a new part in each said slide element.

14. In a load/unloading mechanism for a main conveyor including individual slide bars for supporting of sequentially processed parts moving sequentially from one station to the next, said slide bars being mounted in a guide means and said guide means being vertically movable between a raised part transport position and a lowered work position, comprising a plurality of load support members adapted to be releasably coupled one each to said slide bars, a supporting track structure mounted beneath said guide means, said track structure being movable in a vertical plane for raising and lowering thereof, a carriage movably mounted on each of said tracks and projecting upwardly from said tracks, said carriage being movable between a transfer station aligned with said main conveyor and a change station, a releasable coupling member at the upper end of said carriage adapted to releasably receive a load support member and located beneath the transport position of said guide means and above the work position of said guide means, said plurality of load support members each adapted to releasable connection to said coupling member whereby lowering of said guide means to said work position deposit a load support member to said coupling member with said carriage in said transfer station, a source conveyor laterally movable relative to said track at said change station, said carriage moving vertically beneath the plane of said load support member to transfer the member to said source conveyor and vertically upwardly above said member to pick up said load support member and the associated part for transport from said change station, and means for synchronizing the movement of said main conveyor and said carriage and operable to transfer a load member from s said main conveyor to said conveyor with the guide means in said work position.

15. The loading/unloading mechanism of claim 14 wherein main conveyor is a slide rail conveyor including spaced rails and a common vertical drive connected to both of said rails for said raising and lowering of said rails, said carriage including a U-shaped truck having wheels mounted on each of said track structures and side members projecting upwardly, said load support members including plates on said side members having upwardly opening support recesses adapted to releasably receive a load member, said load members including a cross rod having a length greater than the width of the U-shaped truck.

16. The apparatus of claim 15 wherein said source conveyor including a rigid load support adapted to be aligned with said carriage and having depending members adapted to support one of said cross rods, and means connected to said track structure and movable vertically relative to the plane of said load member and vertical upward movement operable to pick up said load member for transport from said station and vertical downward movement operable to deposit a load member to said source conveyor.

17. In a loading/unloading mechanism for a segmented conveyor including individual segments for supporting of parts moving sequentially through a series of aligned stations including a transfer station, comprising a supporting rail structure, a series of slide members slidably mounted within said rail structure, said rail structure being movable in a vertical plane for raising and lowering of the slide members, a load transfer carriage located as said transfer station and movable to and therefrom, a releasable coupling member secured to the upper end of said carriage and having load member supports to releasably receive a load member, a plurality of load members each of which is adapted for releasable connection to coupling members and to the slide members, means coupled to said rail structures for vertically moving beneath the plane of said load support member on said carriage to deposit a load member to the carriage and movable vertically upwardly above said load support member to pick up said load member, and means for synchronizing the movement of said slide members and said carriage to transfer a load member between the segmented conveyor and said carriage.

18. In a parts processing apparatus, a slide rail conveyor including a plurality of laterally spaced rails and a plurality of slide units mounted end-to-end in said rails and filling of said rails between an inlet end defining a load transfer station and a spaced outlet end, means supporting said rails for positioning between a raised transport position and a lowered work position, a finished part rail located at said outer end adjacent said transfer station, a finished part slide unit located in said change rail, a slide unit moving means adapted to engage the slide unit upstream of said rail for simultaneously moving all of the slide units within said rail units in accordance with the movement of the slide unit at said transfer station, load cross bars spanning said rails and releasably supported in said slide units, means for raising and lowering of said spaced rails, a carriage unit including a bottom truck support movably supported on tracks for longitudinal movement of said carriage unit beneath said transfer station and said change station, said carriage unit including a pair of upstanding vertical plate members projecting upwardly in a plane in closed spaced relation to the sides of said rails with said rials in said work position, each of said plates including similar support portions adapted to engage said slide unit cross bars and having said cross bars transferred to and from said support stations with the rails at said work position, said plates being vertically movable for lifting and lowering movement for selectively removing and placing of a cross bar on said plates, said vertical movement of said plates being controlled in accordance with the linear movement of said carriage to and from said load change station, means moving said plates downwardly in response to the movement to said change station and upwardly in response to the movement to the carriage from said change station to automatically drop a cross bar in response to the movement at the change station and to raise a cross bar in response to movement from the change station, and means for selectively moving of said carriage between said transfer station and said load change station.

19. The apparatus of claim 18 wherein said means to vertically move said plate means comprises means to vertically position said tracks.

20. A load/unload apparatus for a slide rail conveyor including a plurality of laterally spaced rails and a plurality of slide units mounted in said rails and filling of said rails between an inlet end defining a load change station, and a spaced outlet end, means support said rails for positioning between a raised transport position and a lowered work position, a transfer slide rail located at said inlet end and defining a transfer station, a finished part slide unit located in said transfer rail, and slide unit moving means adapted to engage the slide unit upstream of said transfer slide rail for simultaneously moving all of the slide units within said rail units in accordance with the movement of the slide unit to said transfer station, load cross bars spanning said rails and releasably supported in said slide units, comprising a carriage unit including a bottom track support movable supported on tracks for longitudinal movement of said carriage unit beneath said transfer station and said change station, said carriage including a pair of upstanding vertical plate members projecting upwardly in a plane in closed spaced relation to the sides of said rails, each of said plates including similar support portions adapted to engage said slide unit cross bars, said plates being vertically movable for lifting and lowering movement with respect to said slide units for selectively removing and placing of a cross bar on said slide units, said vertical movement of said slide unit being controlled by the linear movement of said carriage between said transfer station and said load change station, means moving said plate members downwardly in response to the movement from said transfer location and upwardly in response to the movement of the carriage into said transfer location to automatically drop a cross bar in response to the movement at the change station and to raise a cross bar in response to movement from the change station, and means for selectively moving of said carriage between said transfer station, and said load change station.

21. The apparatus of claim 20 wherein said means to vertically move said plate means comprises means to vertically position said tracks.

22. An electrocoating apparatus including a slide rail conveyor having a bottom coating section and an upper drying section mounted in vertical spaced alignment, said coating section including a plurality of equispaced work stations and a transport location above said work stations through which the parts are moved into alignment with the work stations with the part moving the same distance between each work station to the next adjacent a slide rail conveyor unit including laterally spaced slide rails extending longitudinally across all of said work stations, laterally spaced slide rails extend throughout said drying section in vertically spaced aligned relation to said slide rails of said coating station, a plurality of slide units filling each of said rails and each slide unit having an identical length corresponding to the length of movement between each of said work stations, a lift transfer device to transfer a slide unit from the downstream end of the coating section to the upstream end of the drying section, a push rod system adapted to transport the slide rail unit at the input end of the coating line and at the input end of the drying section for the length of the slide unit for circulating of said slide units through said coating section and said drying section in a continuous stepped sequence, said drying rails extending beyond the inlet end and the outlet ends of said coating rails for a distance equal to at least one slide unit, a vertically movable transfer rail at the downstream end of said drying sections and vertically moving between a first position horizontally aligned with said drying rails and a second position aligned with said coating rails, said coating rails including an inlet end located immediately downstream of said vertically movable transfer rails whereby said slide unit in said transfer rails moves into said coating rails in response to longitudinal movement of the slide unit from said transfer rail, and means located at said input extension of said coating rail for selectively connecting and disconnecting of parts from said slide units at said inlet end.

23. The apparatus of claim 22 wherein said lift transfer device includes lift transfer rails located immediately adjacent to the downstream end of said coating section rails and the upstream end of said drying section rails, said transfer rails having a length corresponding to a length of a slide unit and providing for lifting of a slide unit from the coating section upwardly into alignment with the drying section for transfer of the slide unit from the coating section into said drying section, said push rod system including a separate push rod unit for engaging of the slide unit in the transfer rail aligned with the input end of the drying section for moving of said engaged slide units into said drying rails and thereby simultaneously moving of the slide unit from the opposite end of the drying rails into the transfer rails at the discharge end of said drying section, and control means for actuating of said push rod units in timed sequence to establish and maintain continuous stepped movement of said slide units and interconnected parts through said apparatus.

24. In the apparatus of claim 22, including vertical support means longitudinally distributed in spaced relation throughout the length of said coating rails, a vertical positioning unit mounted to said support means for vertical guided movement, connector means connecting said vertical positioning unit to said rails for vertical positioning of said rails and for lowering and raising of said rails between a raised transport position and a lowered work position.

25. The apparatus of claim 24 wherein said connector means comprises a first connector connected to said rails, a chain secured to said first connector unit, a sprocket fixedly mounted above the raised level of said rail, said chain extending vertically upwardly from said first connector over said sprocket, a common actuator connected to the extended end of said chains for simultaneously positioning of said chains to thereby raise and lower said rails while maintaining precise planar relationship of said rails and associated slide units.

* * * * *

UNITED STATES PATENT AND TRADEMARK OFFICE
CERTIFICATE OF CORRECTION

PATENT NO. : 5,012,918

DATED : May 7, 1991

INVENTOR(S) : John N. Acker et al

It is certified that error appears in the above-identified patent and that said Letters Patent is hereby corrected as shown below:

Col.14, line 32, Claim 7, after "connector" insert ---unit---; Col.14, line 33, Claim 7, after "level" insert ---of---; Col. 14, line 34, Claim 7, after "upwardly" insert ---from---; Col. 14, line 35, Claim 7, after "common" insert ---actuator---; Col. 14, line 37, Claim 7, after "chains to" insert ---thereby---; Col. 14, line 38, Claim 7, before "planar" insert ---precise---; Col. 14, line 38, Claim 7, after "and" and before "slids" insert ---associated---;Col. 14, line 39, Claim 8, after "said" and before "apparatus" insert ---transfer---; Col. 14, line 40, Claim 8, after "device" insert ---having---; Col. 14, line 41, Claim 8, before "spaced" insert ---laterally---; Col. 14, line 42, Claim 8, after "vertically" insert ---moving---;

UNITED STATES PATENT AND TRADEMARK OFFICE
CERTIFICATE OF CORRECTION

PATENT NO. : 5,012,918
DATED : May 7, 1991
INVENTOR(S) : John N. Acker, et al

It is certified that error appears in the above-identified patent and that said Letters Patent is hereby corrected as shown below:

Col. 14, line 43, Claim 8, after "the" and before "and" insert ---rails---; Col. 14, line 43, Claim 8, after "position" insert ---of said---; Col. 14, line 44, Claim 8, after "transfers a" insert ---part---; Col. 14, line 56, Claim 9, before "an input" delete "for"; Col. 14, line 62, Claim 9, after "rows of" delete "guide means" and substitute therefor ---guides each---; Col. 15, line 46, Claim 12, after "guide" delete "e"; Col. 16, line 24, Claim 14, after "from" delete "s"; Col. 17, line 23, Claim 18, after "said" delete "rials" and substitute therefor ---rails---; Col. 18, line 26, Claim 22, after "adjacent" insert ---work station---.

Signed and Sealed this

Tenth Day of August, 1993

Attest:

MICHAEL K. KIRK

*Attesting Officer*   Acting Commissioner of Patents and Trademarks